(12) United States Patent  
Novak et al.

(10) Patent No.: US 8,083,049 B2
(45) Date of Patent: Dec. 27, 2011

(54) MOTORIZED BACKSTOP (75) Inventors: William Novak, Plainfield, IL (US); Joseph Hilby, Aurora, IL (US); Michael Reichert, Evansville, IN (US)

(73) Assignee: Machine Solutions Providers, Inc., Naperville, IL (US)

( * ) Notice: Subject to any disclaimer, the term of this patent is extended or adjusted under 35 U.S.C. 154(b) by 136 days.

(21) Appl. No.: 12/701,741

(22) Filed: Feb. 8, 2010

(65) Prior Publication Data

US 2011/0192706 A1    Aug. 11, 2011

(51) Int. Cl.
*B65G 15/64* (2006.01)

(52) U.S. Cl. .................... 198/345.3; 193/35 A (58) Field of Classification Search .............. 198/345.3, 198/465.4; 193/35 A
See application file for complete search history.

(56) References Cited

U.S. PATENT DOCUMENTS

| 4,703,843 A | * | 11/1987 | Dixon | 198/345.3 |
| 5,911,297 A | * | 6/1999 | Unterhuber | 193/35 A |
| 7,559,419 B2 | * | 7/2009 | Unterhuber | 198/345.3 |
| 7,565,960 B2 | * | 7/2009 | Worner et al. | 198/459.6 |
| 7,938,246 B2 | * | 5/2011 | Lindemann et al. | 198/345.3 |
| 2007/0089947 A1 | * | 4/2007 | Worner et al. | 198/463.4 |
| 2009/0159393 A1 | * | 6/2009 | Lindemann et al. | 193/35 A |

OTHER PUBLICATIONS

NPM, Nippon Pulse Motor Co., Ltd., Basic of Servomotor Control, Informational Booklet, undated, 11 pages, Nippon Pulse Motor Co., Ltd., Tokyo, 113-033 Japan.
Unknown Author, Photo Showing Conventional Back Stop Circled, undated, 1 page; publisher, city, and state unknown.

* cited by examiner

*Primary Examiner* — James R Bidwell
(74) *Attorney, Agent, or Firm* — Robert L. Marsh

(57) ABSTRACT

A backstop for stopping the movement of a product as it comes off a conveyor of a manufacturing line includes a motor connected by a linkage to a longitudinally moveable strike plate. The motor applies force to the strike plate in accordance with a predetermined curve to bring the product to a soft stop.

20 Claims, 7 Drawing Sheets

MOTORIZED BACKSTOP

The present application relates to a backstop to be positioned at the end of an assembly line for decelerating a rapidly moving product in preparation for packaging the product.

BACKGROUND OF THE INVENTION

One method of improving the efficiency of a manufacturing assembly line is to increase the speed at which each of the steps are undertaken such that an existing assembly line will produce more products without requiring more space. Where the final step of an assembly line is to stack and package a number of finished products that are discharged from a rapidly moving conveyor, the individual products must be decelerated and brought to a stop without causing damage to the product. In the manufacture of a product that has a generally planar configuration, as for example a roofing shingle or a vinyl floor tile, the moving product is directed to a catcher that has at its far end a transverse panel or backstop, which absorbs some of the kinetic energy of the moving item causing the moving product to come to a stop and fall on the catcher where the remainder of the kinetic energy is dissipated thrashing around within the catcher's walls. The catcher has a horizontal surface provided by a pair of parallel rotatable star wheels. Once the product stops moving, the star wheels are rotated through ninety degrees thereby presenting a new pair of surfaces to receive the next moving product while dropping the stationary product below for stacking and packaging.

To accommodate an increase in the number of products coming out the conveyor from a production line, a diverter can be inserted in the line that diverts every other one of the completed products to a second catcher. However, providing a second catcher and packaging station significantly increases the space requirement of a production line.

Increasing the speed of an assembly line results in a higher rate of discharge of product against the backstop. Since kinetic energy varies as the square of velocity, the risk of damage increases exponentially as the discharge speed of the conveyor is increased. Furthermore, increasing the discharge speed of a conveyor reduces the amount of time that occurs between the successive products contacting a backstop.

Existing mechanical backstops are metal plates that are sometime mounted on compressive material. When a mechanical backstop is struck by a rapidly moving item, the surface of the backstop will vibrate for a short period of time as some of the energy of the impact is dissipated. However, very little of the kinetic energy of the moving product is absorbed and the remainder is dissipated bouncing the product around the walls of the catcher before coming to rest on the fins of the star wheel. When product speed is increased, the settling time, that is the time between the impact of the product against an end wall of the back stop and the product coming to rest on the star wheels, will also increase. Shortening the time between the impacts of two successive items of product can result in inadequate recovery time for a compressive backstop, damage to the product, and a longer settling time. On the other hand, shortening the time between impacts will reduce the dwell times, that is the time available between the impact against the backstop and the indexing of the star wheels.

To stop a more rapidly moving product within a shorter dwell time without increasing the risk of damage, the forces applied by a backstop to the product must be carefully controlled. The product must also be decelerated across a greater distance, which means that following the impact, the contact surface of the backstop must withdraw across a longer distance. After the contact surface has retracted and allowed a moving product to reach a stop, the contact surface must again return to its extended position prior to receiving the next moving product.

There is therefore a need for an improved backstop that is capable of decelerating a more rapidly moving item of product without causing damage to the product. Such a backstop must retract across a longer distance so as to control the forces applied to the product, and yet return to an at rest extended position in a shorter period of time to be ready to receive the next moving product.

SUMMARY OF THE INVENTION

The present invention is embodied in a backstop for decelerating a rapidly moving item from a manufacturing line. The backstop in accordance with the invention includes a strike plate positioned across the path of the rapidly moving items. The strike plate is longitudinally moveable between a forward extended position and a rearward retracted position. The backstop also includes an electric motor having a longitudinally moveable output shaft the end of which is joined to the strike plate such that the motor can control movement of the strike plate.

In one embodiment, the motor is a rotary motor having a linkage that mechanically connects the rotary output to the strike plate wherein rotation movement of the output shaft is converted into longitudinal movement of the strike plate.

A detector circuit detects the initial rearward movement of the strike plate and a controller, which as a minimum consists of electronic switches, initiates power to the motor. The strike plate is controlled to decelerate a rapidly moving item of product without causing damage thereto.

In accordance with another aspect of the invention, a power cycle is applied by the controller that causes a programmed deceleration of the strike plate such that it will reach a stop in a retracted position, hesitate for a fixed period of time, then force the strike plate to return from the retracted position to the extended forward position to receive another item.

BRIEF DESCRIPTION OF THE DRAWINGS

A better understanding of the invention will be had after a reading of the following detailed description taken in conjunction with the drawings wherein.

DETAILED DESCRIPTION OF PREFERRED EMBODIMENT

Figure 1:
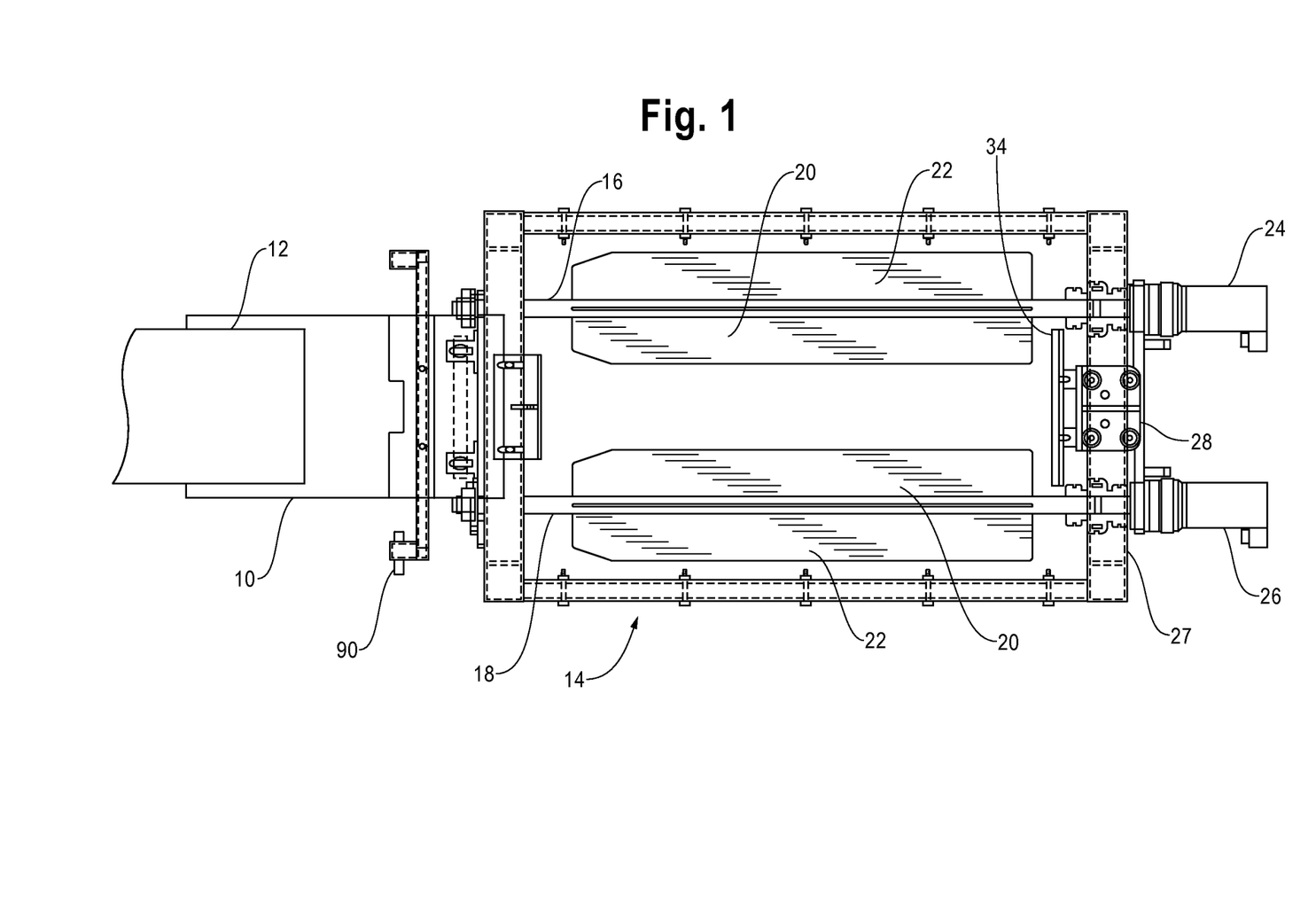
FIG. 1 is a top view of a conveyor belt having a catcher with a backstop at the end of the catcher, the backstop being accordance with the present invention.

Referring to FIG. 1, products, such as roofing shingles are manufactured in a production line at the end of which is a conveyor 10 that delivers a product such as pairs of shingles stacked one above the other with the stacked pairs that typically move at a rate of about six hundred feet per minute. When the product is a pair of shingles, the spacing between successive products is about one foot. To increase the productivity of the production line, it would be desirable to speed up the conveyor 10 to deliver the product, in our example pairs of shingles, at the rate of twelve hundred feet per minute with the same spacing between successive products 12.

Figure 2:
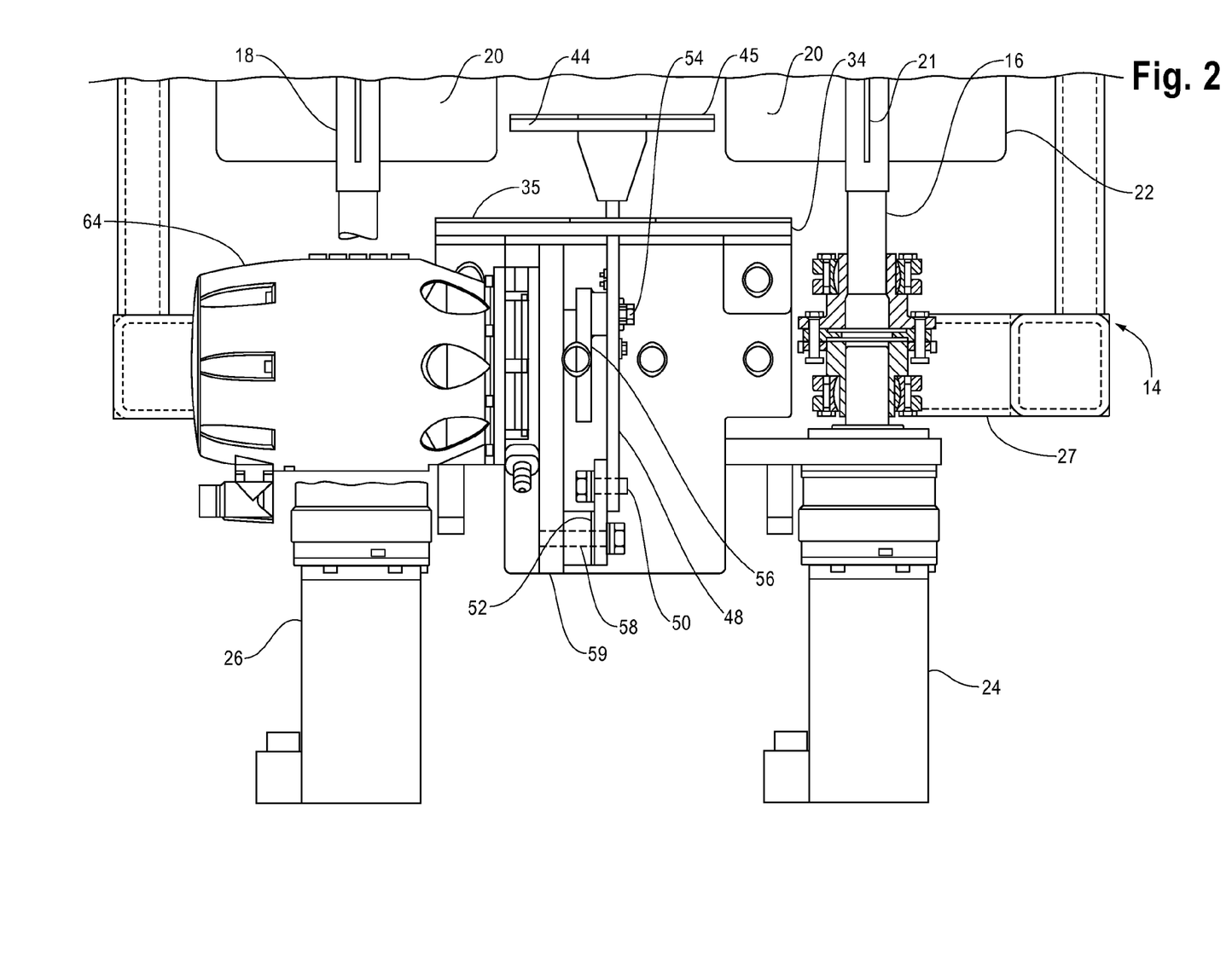
FIG. 2 is an enlarged top view of the end of the catcher shown in FIG. 1 more clearly showing the backstop.
Figure 3:
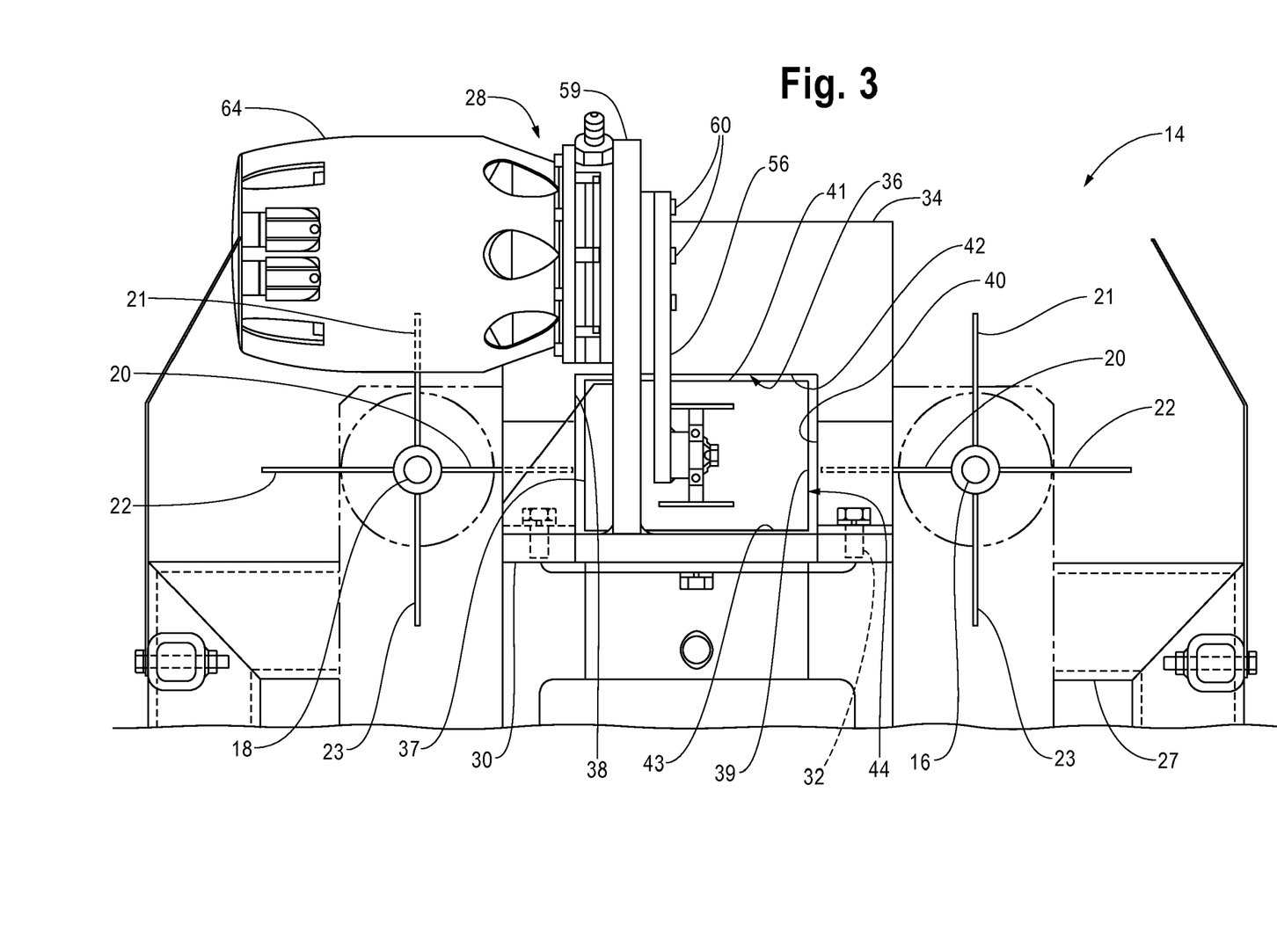
FIG. 3 is a similarly enlarged end view of the catcher shown in FIGS. 1 and 2.

Referring to FIGS. 1 through 4, the conveyor 10 delivers the product 12 to a catcher 14. The catcher 14 includes a pair of spaced apart parallel horizontally oriented shafts 16, 18, each of which has four radially outwardly extending flanges 20, 21, 22, 23 forming star wheels with the shafts 16, 18 rotated by a pair of synchronized servo motors 24, 26. The configuration of the flanges on the shafts 16, 18 that form the star wheels is best shown in FIG. 3. The servo motors 24, 26 position the shafts 16, 18 such that the surfaces of flange 20 of shafts 16 and 18 define a planar horizontal surface upon which the product 12 discharged from the conveyor 10 can rest. Mounted on the outer end bar 27 of the catcher 14 is a backstop 28 that receives the impact of the rapidly moving product 12 and absorbs most of the kinetic energy of the impact such that the longitudinal movement of the product 12 ceases and the product 12 rapidly comes to rest on the upper surfaces of flange 20 of shafts 16 and 18. After the product 12 has come to rest, the servo motors 24, 26 are indexed to rotate the shafts 16, 18 through a turn of ninety degrees thereby allowing the product 12 to drop into a stacking station below and presenting a horizontal surface defined by the upper surfaces of the next flange 21 of shafts 16 and 18 to receive the product 12.

When the product 12 is being discharged from the conveyor 10 at the rate of six hundred feet per minute (a typical speed when the product is a pair of shingles), the successive product 12 arrives in a fraction of a second behind the preceding product 12, and therefore the horizontal movement of the product 12 must be stopped by the backstop 28 and dropped by the servo motors 24, 26 within that same fraction of a second. Where the speed of the conveyor 10 is increased to twelve hundred feet per minute and the distance between successive products 12 on the conveyor is not reduced, so the time available between the arrival of successive shingles is cut in half, perhaps to two hundred milliseconds. Also, since the product 12 is moving at double the rate, the kinetic energy is quadrupled ($E_k = \frac{1}{2} mv^2$). A conventional backstop that consists of a panel retained on shock-absorbing mounts cannot recover within the time frame available and be ready to receive the succeeding product 12. Nor is there sufficient dwell time for the product to come to rest. And finally, force cannot be applied over a sufficiently long distance to avoid causing damage to product 12, such that the product becomes damaged. Accordingly, increasing the conveyor speed to twelve hundred feet per minute requires a backstop 28 in accordance with the present invention.

Figure 4:
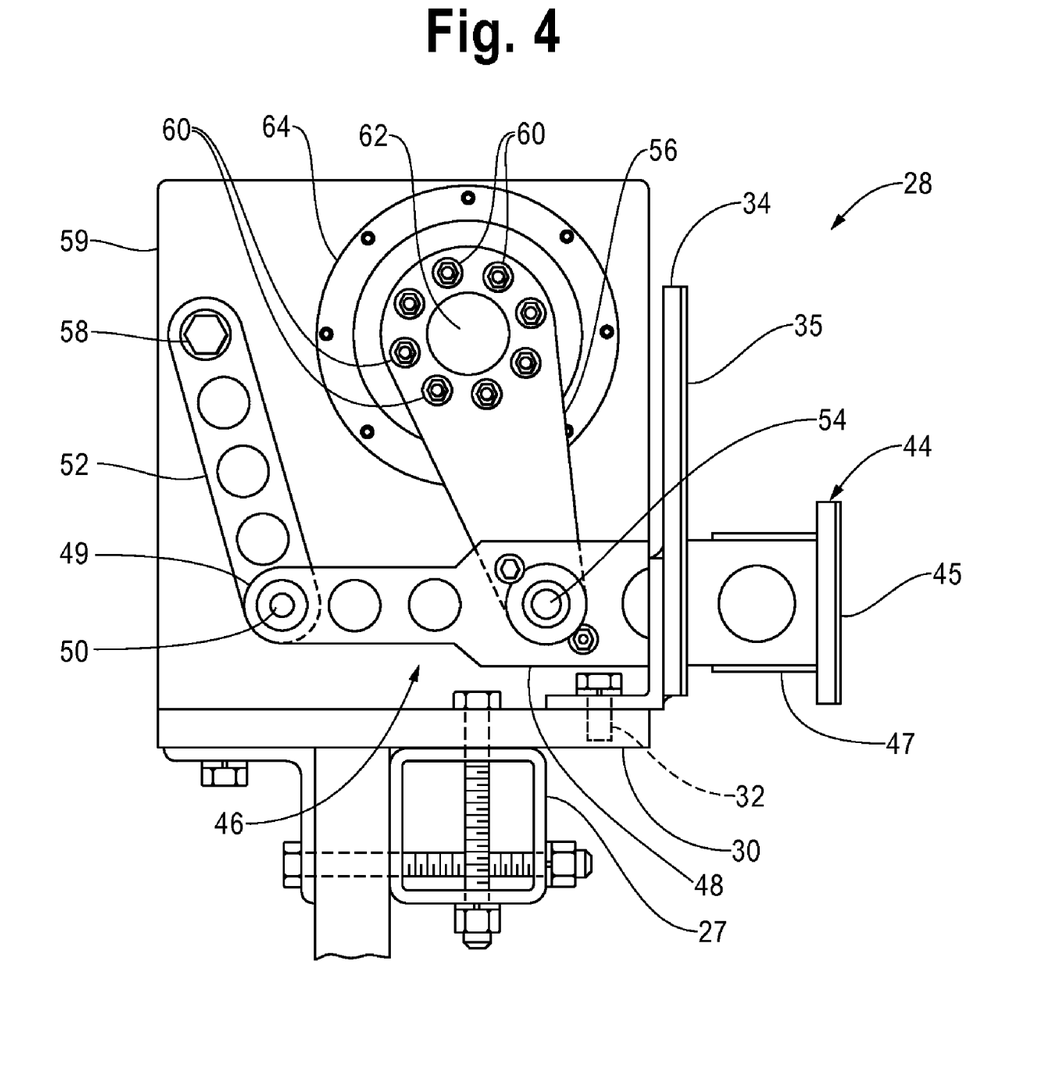
FIG. 4 is a side view of the backstop shown in FIGS. 2 and 3 showing the linkage between the strike plate and the motor.

Referring to FIGS. 2 through 4, the backstop 28 is mounted on a transverse horizontal plate 30 that extends across the outer end bar 27 at the distal end of the catcher 14. Attached to the plate 30 on mounting bolts 32 is a stationary generally rectangular vertical end wall 34 having a contact surface 35. The stationary end wall 34 has a rectangular cutout portion 36 having parallel vertical side edges 38, 40, and a horizontal upper edge 42. Longitudinally moveable in a direction parallel to the movement of the product 12 is a retractable strike plate 44 having a contact surface 45. The strike plate 44 has parallel outer edges 37, 39 that are spaced apart a distance that is less than the distance between side edges 38, 40 of the cut out 36 in the end wall 34, and upper and lower edges 41, 43 that are spaced apart a distance that is less than the distance between plate 30 and the upper edge 42 of the cut out 36. The strike plate 44 is retained parallel to the stationary end wall 34 and moveable perpendicular thereto between a forward fully extended position, visible in FIG. 4, in which the contact surface 45 of the strike plate 44 is approximately three inches forward of the contact surface 35 of the end wall 34, and a retracted position in which the sides of the strike plate 44 fit within the cut out portion 36 of the end wall 34. While in the retracted position, the contact surface 45 of the strike plate 44 is coplanar with the contact surface 35 of the end wall 34, or perhaps even a short distance withdrawn into the cut out portion 36.

In the preferred embodiment, as best shown in FIG. 4, the strike plate 44 is mounted on a linkage 46 that includes an elongate horizontal arm 48 having a forward end 47 and a rearward end 49. The forward end 47 is welded to the rear surface of the strike plate 44 and retains the strike plate 44 parallel to the end wall 34 and perpendicular to the movement of the product 12. At the rearward end 49 of the arm 48 is a first bearing 50 for rotatably receiving a pivot pin, unnumbered, at one end of an idler arm 52, and midway along the length of the arm 48 is a second bearing 54 for rotatably receiving a second pivot pin, unnumbered, at one end of a power arm 56. The first and second arms 52, 56 are identical in length with the second end of the idler arm 52 rotatably mounted on an idler shaft 58 on a support plate 59. The second end of the power arm 56 is drivingly connected by a plurality of planetary bolts 60 to a drive shaft 62 extending from a position feedback motor such as a servo gear motor 64 that is also mounted on the support plate 59. The distance between the center of the first bearing 50 and the center of the idler shaft 58 is equal to the distance between the center of the second bearing 54 and the center of the drive shaft 62. Similarly, the distance between the center of the idler shaft 58 and the center of the drive shaft 62 is equal to the distance between the center of first and second bearings 50, 54 of the arm 48. As a result, the first and second arms 52, 54 always retain the longitudinal arm 48 parallel to the underlying plate 30.

Figure 5:
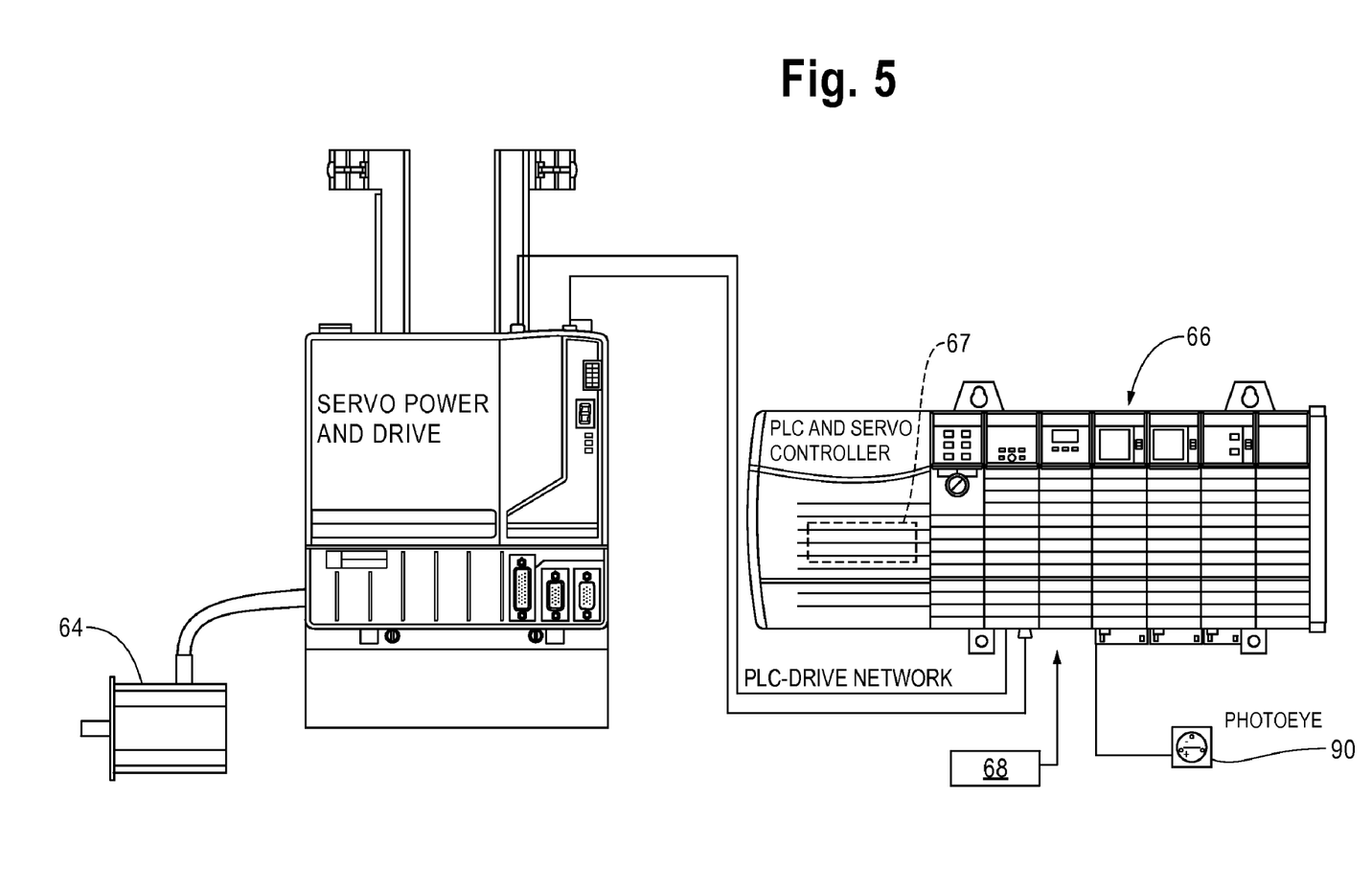
FIG. 5 is a layout of the control panel for the backstop shown in FIGS. 2 through 4.

Referring to FIG. 5, it is desirable that the motor 64 be capable of providing position feedback, that is, have closed loop control to monitor its own position. This can be performed by a servo motor, although other types of electric motors can be configured to provide the needed position feedback. For example, a stepper motor can be provided with a suitable encoder to provide the needed feedback. For the purpose of this discussion, the motor 64 will be described as being a position feedback motor having a motion control device, and it is the position feedback feature that enables a servo motor to detect rearward movement of the strike plate 44 as described below. The position feedback motor 64 has associated therewith a programmable logic controller 66 that includes a memory 67, hereinafter referred to as a processor. The processor 66 responds to a predetermined instruction code or recipe 68 that is stored in the controller memory 67 and causes the motor 64 and the strike plate 44 to impose the desired deceleration rate to the product 12.

Referring to FIGS. 4 and 5, when the backstop 28 is at rest, that is, subsequent to decelerating one product 12 and prior to receiving the next product 12, the strike plate 44 is in the forward fully extended position in which the contact surface 45 is approximately three inches forward of the contact surface 35 of the end wall 34. The processor 66 is programmed to retain the strike plate 44 in the forward fully extended position. When the next product 12 from the conveyor 10 is delivered to the catcher 14, the product move along the horizontal surfaces of flanges 20 until the end of the product 12 strikes the surface 45 of the strike plate 44. The impact between the moving product 12 and the strike plate 44 urges the strike plate 44 towards the end wall 34 and commences rotation of the drive shaft 62 of the motor 64. As the drive shaft 62 rotates, the movement of the shaft 62 is detected by the position feedback loop associated with the motor 64. At the onset of motion of the shaft 62, the processor 66 instructs the motor 64 to return the strike plate 44 to the forward fully extended position and at the same time provides current to the motor 64 to apply torque in accordance with the earliest portion of the recipe 68.

Referring to FIGS. 4, 5, 6, and 7, when movement of the strike plate 44 is detected by the processor 66, the processor 66 begins a series of commands in accordance with the recipe 68 and result in a predetermined power cycle 70 applied to the windings of the position feedback motor 64. The power cycle 70 begins with the strike plate 44 in the fully extended position and the motor 64 applying a preset retention torque 83. When the processor 66 first detects rearward movement of the strike plate 44, the first stage 72 of the power cycle 70 begins, which results in the application of torque by the motor 64 that follows a predetermined curve 74. The processor 66 continuously monitors the position of the drive shaft 62 and the strike plate 44 by virtue of the closed loop feedback of the motor 64 and, and as the strike plate 44 retreats toward the end plate 34, the processor 66 directs the motor 64 to return the strike plate 44 to a target position that is short of the fully extended position. Preferably, the target position is typically about 0.2 inches forward of its present position such that the target position retreats as the strike plate 44 retreats. This prevents the motor 64 from inadvertently overpowering the product 12 and throwing it away from the end plate 34 as the strike plate returns to the fully extended position. Also, as the strike plate 44 retreats, the processor 66 adjusts the power along the curve 74 corresponding to the position of the strike plate 44 to decelerate the retracting movement of the strike plate 44.

Figure 6:
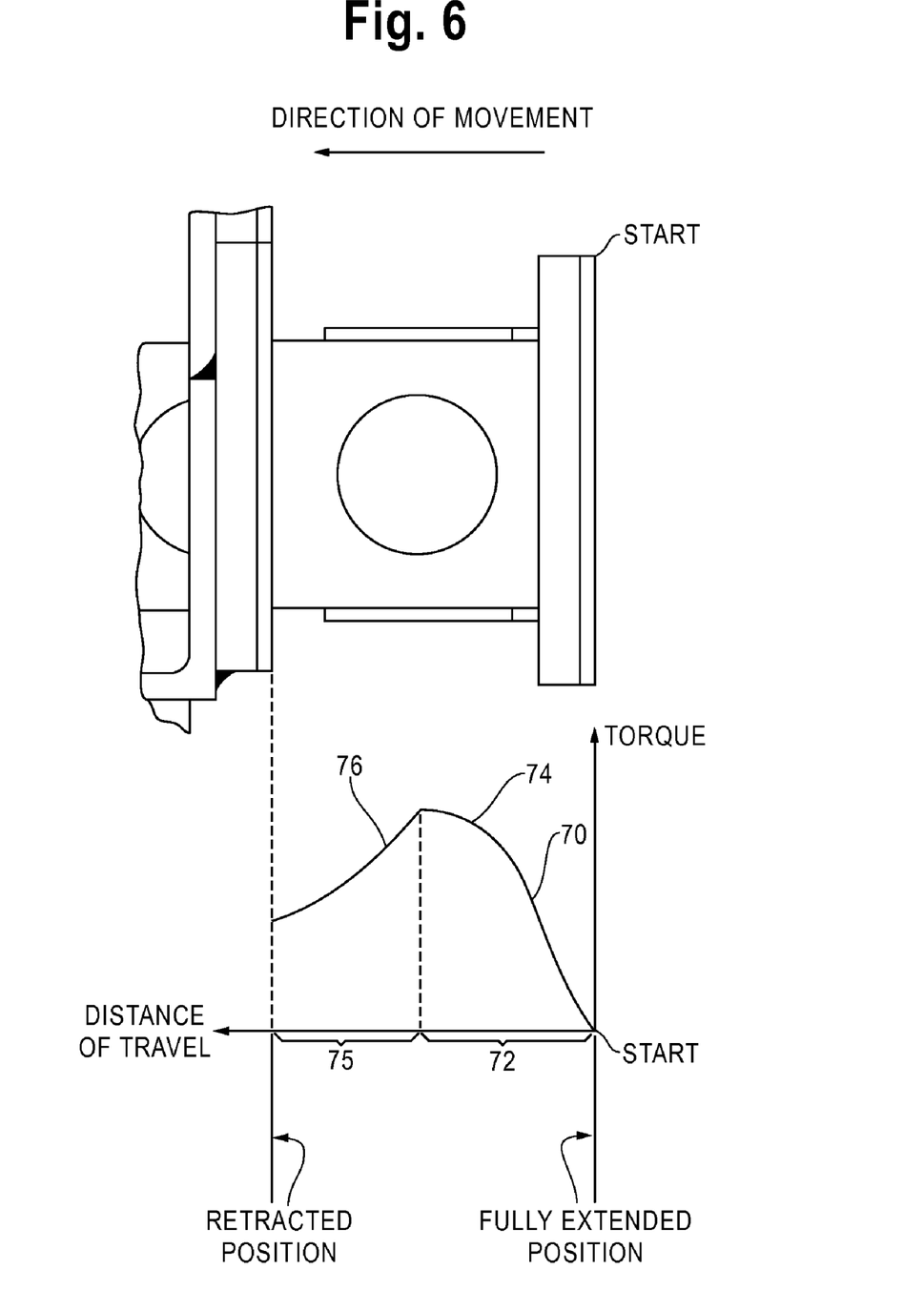
FIG. 6 is a graph of a typical torque versus position curve useable with a position feedback motor, the graph limited to the first two phases of a power cycle for the backstop.
Figure 7:
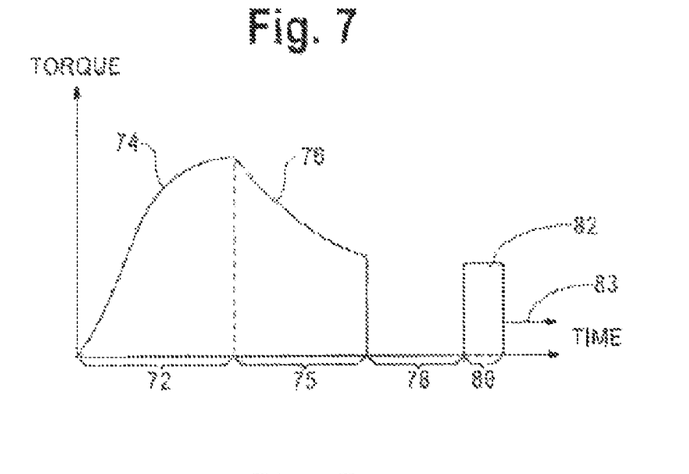
FIG. 7 is a graph of the torque against time for the entire power cycle for a position feedback motor with part of the power cycle corresponding to the curve shown in FIG. 6.

As the strike plate 44 retreats to about one-half of its fully extended position, the power cycle 70 moves to its second phase 75 in which torque is applied in accordance with a new curve 76. In the second phase 75, the torque applied is gradually reduced so as not to overpower the motion of the products 12 and push it away from the end wall 34. At the end of the second phase 75, as determined from monitoring the closed loop control of the motor 64, the retraction of the strike plate 44 will come to a stop, preferably when the surface 45 of the strike plate 44 becomes co-planar with the surface 35 of the end plate 34. The moving product 12 will then hit the end plate 34 at a greatly reduced speed. Preferably, the product will hit the end plate 34 without rebounding such that it comes to a complete stop after a very short settling time.

The recipe 68 by which current is applied to the motor 64 is tailored to the physical properties of each moving product. If the product speed is slower than the expected speed, as stored in the memory 67 of the processor 66, the processor 66 will reduce the torque profile 74, 76 proportionately by providing less power to the motor 64. Conversely, if the product speed is greater than the expected speed, the processor 66 will proportionately increase the power to the motor 64 to provide a corresponding increase in the torque profile 74, 76. The angular position of the shaft 62 and the linear position of the strike plate 44 are monitored by the processor 66 and the torque profile 74, 76 applied is changed as needed to bring about the desired deceleration of the product.

Once the angular position of the shaft 62 and the strike plate 44 having reached the retracted position, the processor 66 sends a signal to index the servo motors 24, 26 and rotates the shafts 16, 18 of the star wheels to drop the product 12 to the stacking and packaging station below. At the same time, the power cycle 70 enters a third stage 78 in which the motor 64 retains the strike plate 44 in the retracted position. After the servo motors 24, 26 have completed their ninety degree rotation of the star wheel shafts 16, 18, the power cycle 70 enters a fourth stage 80, best shown in FIG. 7, in which current is again supplied to the motor 64 to apply torque according to a curve 82 and urge the arm 48 outwardly until the strike plate 44 is again returned to the fully extended position. Once the strike plate 44 returns to the extended position, the power cycle 70 returns to its standby condition in which a gentle force 83 is applied to the strike plate 44 to retain the strike plate 44 in the fully extended position. This is the standby condition in which the processor 66 waits for the strike plate 44 to respond to the impact of another item of product 12.

A feature of the present invention is that the effective mass of the strike plate 44 including the arm 48, the rotational inertia of the shaft 62, and the internal friction of the motor 64 are less than the mass of the product 12 such that the impact of an item of product 12 against the surface 45 of the strike plate 44 results in an inelastic transfer of energy from the moving product 12 to the strike plate 44 and to the structure attached thereto. It should be appreciated that if the mass of the strike plate 44 and the structure attached thereto exceeded the mass of the product 12, the collision would be elastic and the product 12 would bounce away from the strike plate 44 rather than continuing to move in the same direction along with the strike plate 44. It is by virtue of the strike plate 44 moving with the product 12 that the motor 64 can apply a force in accordance with the recipe 68 to decelerate the product 12 and bring it to a stop.

The power cycle 70, as depicted in FIG. 7, is constructed to create an active backstop that provides a soft impact to a moving product that will recover in time to receive the next product entering the catcher 14. Preferably, the backstop will decelerate a moving product and index the star wheels to drop the product so as to be ready for a successor within fifty milliseconds, a fraction of the operating time of existing catchers.

The advantage of using a position feedback motor to provide a backstop is that the force applied by the motor 64 can be continuously monitored with respect to the position of the output shaft 62. The processor 66 can issue new commands in response to incremental movements of the shaft 62 which correspond to thousandths of an inch of movement of the strike plate 44. A portion of the torque profile 74, 76, as shown in FIG. 6, is varied to suit the product and the product speed. Peak torque positions can be set as parameters and can be changed as needed.

The processor 66 can be programmed to provide a desirable start time for the servos 24, 26 of the star wheels to minimize the time that the product 12 rests on the surfaces of the star wheel flanges 20. The dwell time, the time from the impact of the product against the end wall 34 until the indexing of the star wheel, can also be adjusted as a tunable parameter and minimized.

As shown in FIGS. 1 and 5, the catcher 14 includes a photoeye 90 which is used to detect the leading and trailing edges of a product 12 such as the pairs of shingles. The output from the photoeye 90 is directed to the processor 66. The processor 66 measures the time between the leading and trailing edges and has in its memory the overall length of the product 12, in this case the length of a pair of shingles. The time between the leading and trailing edges are used to calculate product speed and the time available for the backstop 28 to decelerate the product 12 and to index the star wheels servos 24, 26 before the next pair of shingles 12 arrive. The processor 66 compares the information determined from the photoeye 90 to the information received from the strike plate 44 and calculates a maximum time that can elapse before the star wheel servos 24, 26 must be indexed in order for the catcher 14 to receive the next item of product 12.

Figure 8:
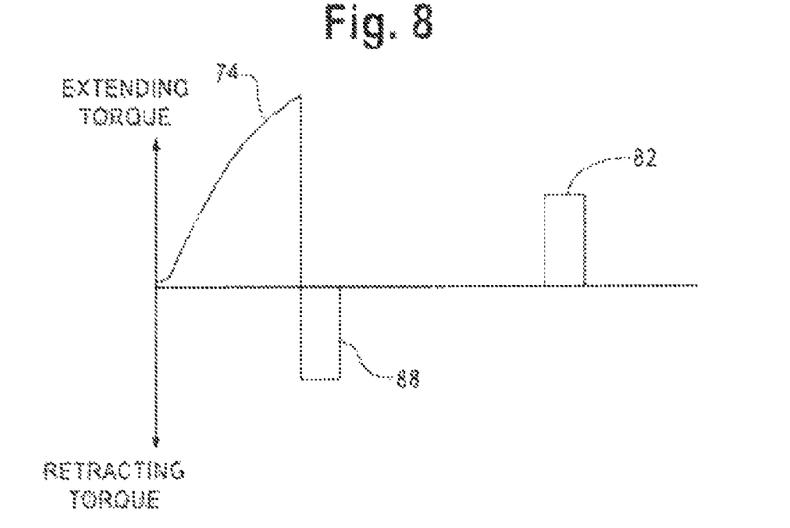
FIG. 8 is a graph of torque versus time of a power cycle that has been modified for a product that is moving at such a slow rate that it would be stopped by the strike plate before reaching the end plate, if the power cycle of FIG. 7 were followed.

Referring to FIGS. 7 and 8, a portion of the backstop torque profile 74, 76 is automatically modified by the processor 66 in response to changes in product speed as calculated from information provided by the photoeye 90. However, as shown in FIG. 8, in the event the processor 66 calculates that the moving product 12 does not have sufficient energy to push against the backstop 28 and reach the back wall 34, the processor 66 will dramatically alter the torque profile applied by the backstop 28. Depending on the product speed, the controller 66 may delete substantially all, or any suitable part of the torque profile 74, 76. When the product speed is very low, the controller 66 may rapidly withdraw the strike plate 44, either all the way to the back wall 34, or to a position shortly before the back wall 34. FIG. 8 depicts a torque profile in which the first portion is cut short and replaced with a reverse torque 88 to withdraw the strike plate 44 to a position a short distance outward of the forward surface 35 of the stationary plate 34. This enables the slower moving pairs of shingles to hit the stationary plate 34.

It should be appreciated that the motor 64 could be a linear motor rather than a rotary motor as described. A linear motor would not require a linkage 46 to convert rotational output to linear motion, and a backstop in accordance with the invention can be constructed using a linear motor. A rotary motor has been described with respect to the preferred embodiment only because at least one commercially available rotary position feedback motor has been found having the operating and size characteristics needed for the product described, namely roofing shingles. Where a linear position feedback motor is available that has the characteristics needed for a given product or production line, it can and probably should be employed rather than a rotary motor.

Although it is desirable that the motor 64 have position feedback capability, it should be appreciated that the essential element of the invention is the use of an electric motor to decelerate a rapidly moving item. In its simplest form, the invention consists of a moveable strike plate 44 connected to an electric motor 64, a suitable detection means for detecting rearward movement of the strike plate 44 indicative of an impact by an item of product 12, and a controller 66 that applies power to the motor 64 as the strike plate 44 moves from its extended position to its retracted position.

Figure 9:
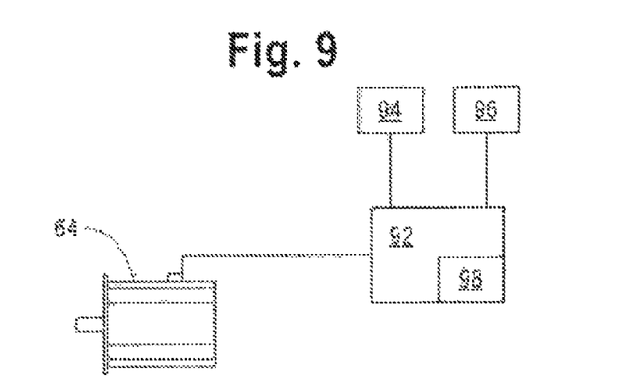
FIG. 9 is a block diagram of the elements of a backstop in accordance with the invention.

Referring to FIG. 9, the controller 92 may be an electronic switching device connected to a first electronic detector 94, such as a photoeye, that generates a first signal when a moving item first contacts the strike plate 44, and to a second electronic detector 96 that generates a second signal as the strike plate 44 moves near the retracted position. When the controller 92 receives a signal from the first detector 94, it will apply power to the motor 64 causing it to decelerate the moving item. When the controller 92 receives a signal from detector 96, it will terminate power to the motor 64 allowing it to come to a stop in the retracted position. The controller 92 may also include a timing circuit 98 to measure a dwell time after which the controller 92 can momentarily reverse the power to the motor 64 to return the strike plate 44 to its extended position.

While the present invention has been described with respect to two embodiments, it will be appreciated that many modifications and variations may be made without departing from the spirit and scope of the invention. It is therefore the intent of the appended claims to cover all such modifications and variations which fall within the spirit and scope of the invention.

What is claimed:

1. A backstop for decelerating a rapidly moving item, said backstop comprising
    a strike plate positioned across a path of said moving item, said strike plate moveable between a forward position and a rearward position,
    an electric motor having a linear output shaft connected to said strike plate,
    a controller for controlling the application of power to said motor,
    said controller applying power to said motor upon a rearward movement of said strike plate wherein said motor applies force to said output shaft and resistance to said movement of said strike plate to decelerate said rapidly moving item.

2. The backstop of claim 1 wherein said motor has closed loop control to monitor its own position.

3. The backstop of claim 1 wherein said motor is a rotary motor and said backstop further comprises
    a linkage mechanically connecting a rotary output of said motor to said strike plate wherein longitudinal movement of said strike plate is connected to rotational movement of said rotary output.

4. The backstop of claim 3 wherein said motor is a servo motor.

5. The backstop of claim 3 wherein said motor is a stepper motor with an encoder for providing closed loop feedback.

6. The backstop of claim 1 wherein said controller applies power to said motor in accordance to a predetermined power cycle tailored to said item.

7. The backstop of claim 1 and further comprising
    means for detecting rearward movement of said strike plate,
    said means for detecting connected to said controller, and
    said controller initiating power to said motor in response to said means for detecting.

8. The backstop of claim 1 and further comprising
    means for detecting that said strike has moved to said retracted position,
    said means for detecting connected to said controller, and
    said controller terminating power to said motor in response to said means for detecting.

9. The backstop of claim 1 wherein said controller is
    a programmable logic controller, and wherein
    said controller calculates product speed from movement of said strike plate, and
    said controller adjusting power to said motor in response to a calculated speed of said product.

10. The backstop of claim 1 and further comprising a photoeye for detecting a leading edge and a trailing edge of an item prior to striking said backstop.

11. The backstop of claim 10 wherein
    said controller calculates a speed of said item from time elapsed between detection of said leading edge and detection of said trailing edge, and
    said controller adjusting said power cycle for force applied by said motor in response to said calculated speed.

12. The backstop of claim 11 wherein
said controller terminates said force prior to the end of a power cycle in the event said controller determines that said item is moving slower than a predetermined minimum speed.

13. The backstop of claim 11 wherein said controller withdraws said strike plate from said moving product prior to the end of a power cycle in the event said controller determines that said item is moving slower than a predetermined minimum speed.

14. A backstop for decelerating a rapidly moving item, said backstop comprising
a strike plate positioned across a path of said moving item, said strike plate moveable between a forward position and a rearward position,
an electric motor having closed loop position feedback control and having a longitudinally moveable output connected to said strike plate,
a controller for controlling the application of power to said motor,
said controller applying power to said motor upon said position feedback detecting a rearward movement of said strike plate wherein said power is applied in accordance with a predetermined power cycle to provide resistance to said movement of said strike plate to decelerate said rapidly moving item.

15. The backstop of claim 14 wherein said motor is a rotary motor having a rotational output and further comprising
a linkage mechanically connecting said rotational output to said strike plate wherein longitudinal movement of said strike plate is converted to rotational movement of said output.

16. The backstop of claim 15 wherein said motor is a servo motor.

17. The backstop of claim 15 wherein said motor is a stepper motor with an encoder for providing closed loop feedback.

18. The backstop of claim 14 and further comprising a photoeye for detecting a leading edge and a trailing edge of an item prior to striking said backstop.

19. The backstop of claim 18 wherein
said controller calculates a speed of said item from time elapsed between detection of said leading edge and detection of said trailing edge, and
said controller adjusting said power cycle applied to said motor in response to said calculated speed.

20. The backstop of claim 14 wherein
said controller terminates resistance to said strike plate prior to the end of a power cycle in the event said controller determines that said item is moving slower than a predetermined minimum speed.

* * * * *